United States Patent
Bevacqua et al.

(10) Patent No.: US 10,460,357 B1
(45) Date of Patent: Oct. 29, 2019

(54) SYSTEMS AND METHODS FOR ENHANCED ADVERTISEMENTS

(71) Applicant: Amazon Technologies, Inc., Reno, NV (US)

(72) Inventors: David Michael Bevacqua, Seattle, WA (US); David James Roy Erdmann, Edmonds, WA (US)

(73) Assignee: Amazon Technologies, Inc., Reno, NV (US)

( * ) Notice: Subject to any disclaimer, the term of this patent is extended or adjusted under 35 U.S.C. 154(b) by 357 days.

(21) Appl. No.: 13/775,998

(22) Filed: Feb. 25, 2013

(51) Int. Cl.
*G06Q 30/02* (2012.01)

(52) U.S. Cl.
CPC .................... *G06Q 30/0277* (2013.01)

(58) Field of Classification Search
CPC .................................................. G06Q 30/0277
USPC ........... 705/14.53, 14.27, 22, 5, 14.64, 7.29, 705/26.8, 26.41, 14.51, 14.23, 27.2, 26.3, 705/14.26
See application file for complete search history.

(56) References Cited

U.S. PATENT DOCUMENTS

| | | | | |
|---|---|---|---|---|
| 8,719,104 B1* | 5/2014 | Endresen | ........... | G06Q 30/0643 705/27.2 |
| 2002/0082932 A1* | 6/2002 | Chinnappan | ...... | G06F 17/30873 705/26.8 |
| 2003/0216960 A1* | 11/2003 | Postrel | .................. | G06Q 30/02 705/14.26 |
| 2005/0177386 A1* | 8/2005 | Essa | ....................... | G06Q 10/02 705/5 |
| 2006/0149637 A1* | 7/2006 | Zellner | ................ | G06Q 10/087 705/14.23 |
| 2007/0083440 A1* | 4/2007 | Wirtz | ..................... | G06Q 30/02 705/14.51 |
| 2007/0118434 A1* | 5/2007 | Mengerink | ........ | G06Q 30/0613 705/26.41 |
| 2008/0228582 A1* | 9/2008 | Fordyce | ................. | G06Q 30/02 705/14.27 |
| 2008/0249841 A1* | 10/2008 | Ruark | .................... | G06Q 30/02 705/7.29 |
| 2011/0264551 A1* | 10/2011 | Lau | ........................ | G06Q 30/06 705/26.3 |
| 2012/0029998 A1* | 2/2012 | Aversano et al. | .......... | 705/14.27 |
| 2012/0215639 A1* | 8/2012 | Ramer et al. | .............. | 705/14.53 |
| 2012/0290423 A1* | 11/2012 | Hoersten | ............ | G06Q 30/0645 705/22 |

FOREIGN PATENT DOCUMENTS

KR      20020095821 A  * 12/2002

OTHER PUBLICATIONS

Suad Alrannouni, Enhancing mobile advertising via Bluetooth technology, 2008 (Year: 2008).*

* cited by examiner

*Primary Examiner* — Tarek Elchanti
(74) *Attorney, Agent, or Firm* — Eversheds Sutherland (US) LLP

(57) ABSTRACT

Systems and methods for receiving a content request, generating and transmitting an advertisement request, receiving an advertisement, determining a product or service associated with the advertisement, and generating an e-commerce functionality associated with the product or service. The e-commerce functionality and advertisement may be transmitted to a user device and rendered to a user via the user device.

19 Claims, 10 Drawing Sheets

SYSTEMS AND METHODS FOR ENHANCED ADVERTISEMENTS

BACKGROUND

Individuals may use a user device, such as a laptop computer or smart phone, to request content such as a website from a website publisher computer. The website publisher computers may subsequently request an advertisement from an advertisement server computer. The advertisement server computers may provide the website publisher computers with an advertisement responsive to the request for advertisement and the website publisher computers may subsequently provide the requested content along with the advertisement to the user device. The user device may then render the content as well as the advertisement to the user. Oftentimes the user may be able to select the advertisement and be redirected to another website for a product or service associated with the advertisement.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures.

DETAILED DESCRIPTION

Overview

Figure 1:
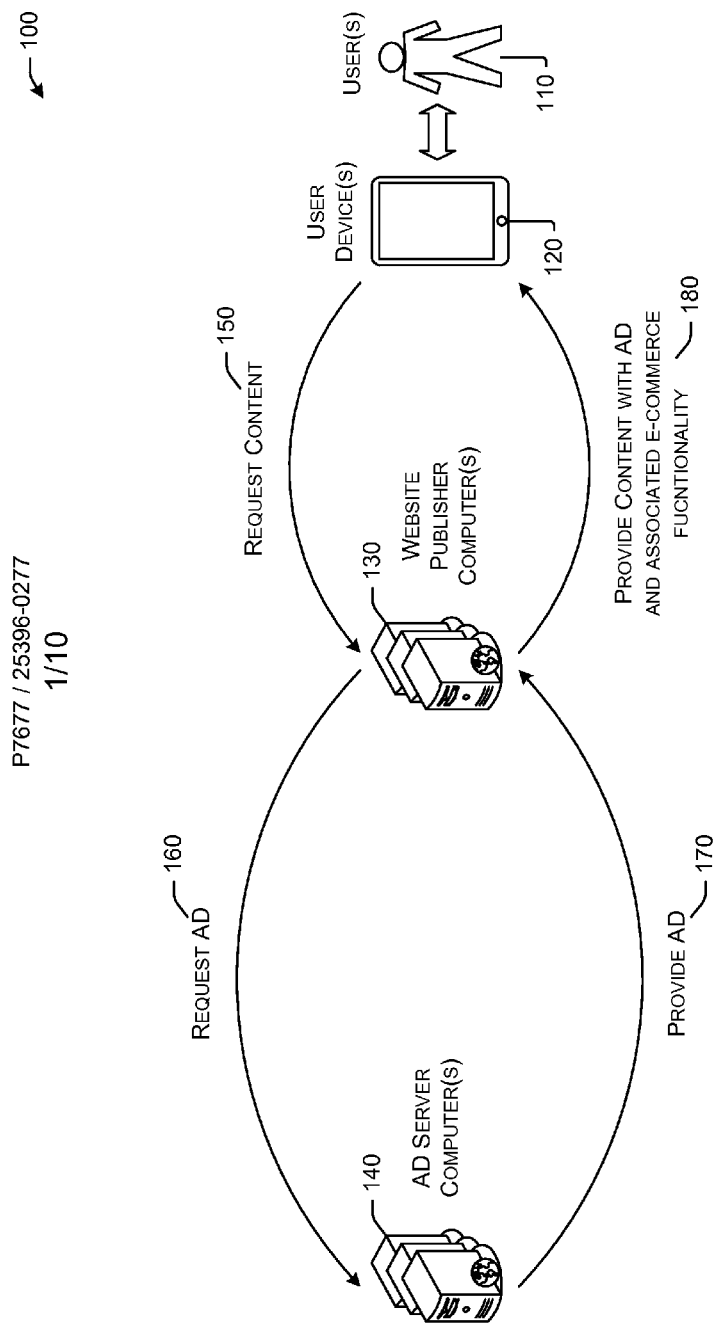
FIG. 1 is a simplified schematic diagram illustrating an example interaction flow for providing content and an advertisement with associated electronic commerce (e-commerce) functionality, in accordance with illustrative embodiments of the disclosure.

Embodiments of the disclosure are directed to, among other things, enhancements to advertisements such as e-commerce functionality associated with the advertisement. The e-commerce functionality may be added on or adjacent to the advertisement as rendered on a user device to a user. The e-commerce functionality may have one or more user interaction regions which may be selected by the user to initiate an e-commerce process, such as a process to purchase a product and/or service associated with the e-commerce functionality.

Embodiments of the disclosure may include one or more website publisher computers that may be configured to receive a content request from a user device. The user device may provide the content request based upon interactions with a user via one or more user interfaces of the user device. The website publisher computers may further be configured to provide content to the user device that may be rendered on the user device to the user requesting the content. The website publisher computers may yet further be configured to request an advertisement from an advertisement server computer. In certain embodiments, the advertisement request may include information associated with the user that requested the content via his or her user device. This information may include demographical information and/or user preference information. This information may be accessed from a database or other repository of user information.

The advertisement server computers may provide an advertisement responsive to the advertisement request from the website publisher computer. The website publisher computers may be configured to receive the advertisement from the advertisement server computers via one or more networks. The advertisement as used herein may refer to any variety of internet delivered or website delivered advertisement including, but not limited to, interstitial, banner, pop-up, floating, pop-under, trick, banner, wallpaper, or combinations thereof. In certain embodiments, the advertisement received by the website publisher computers from the advertisement server computers may be based at least in part on user preferences and/or other user parameters that were provided by the website publisher computers to the advertisement server computers. The website publisher computers, upon receiving the advertisement from the advertisement server computers, may be configured to provide the advertisement and the requested content to the user device for rendering to the user requesting the content.

The website publisher computers may further be configured to ascertain a product or service associated with the advertisement that it receives from the advertisement server computers responsive to the advertisement request. The website publisher computers may use a variety of mechanisms for ascertaining the product or service associated with the received advertisement. In some cases, the received advertisement may have metadata or an application, associated therewith, that is indicative of the product or service associated with the advertisement. In some cases, this metadata may be text based metadata such as extensible markup language (XML) based text information. The application may be any suitable application or code, such as a JavaScript snippet. The website publisher computers may employ other mechanisms for ascertaining the product or service associated with the received advertisement, especially in cases where appropriate metadata or an application indicative of the associated product or service is not received with the advertisement. In certain embodiments, the website publisher computers may perform image analysis to ascertain a product or service associated with the advertisement. For example, there may be text rendered on the advertisement in the form of images and the website publisher computers may ascertain the text and determine the product or service associated with the advertisement from the image of the text. It will be appreciated that a variety of image analysis mechanisms may be used by the website publisher computers, such as image sharpening, brightening, dithering, and/or other image modifications. Additionally, text analysis algorithms may be employed by the website publisher computers.

In certain other embodiments, the website publisher computers may be configured to perform a click-through analysis. The advertisement received by the website publisher computers may include an address of a website, such as a hyper-text markup language (HTML) based address. The website corresponding to the address may provide descriptions and/or identification of the product or service associated with the advertisement. The website publisher computers may access the website associated with the advertisement utilizing the address associated with the advertisement. Once the website publisher computers access the website associated with the advertisement, the website publisher computers may perform a variety of processes such as image analysis, text analysis, or audio analysis to determine the product or service associated with that advertisement. For example, if the advertisement is related to a vehicle and the website publisher computers access a website associated with that vehicle it may receive a variety of images, textual data, and/or audio that may provide a mechanism for the website publisher computers to determine that the advertisement is associated with the vehicle. Therefore, in performing the click-through analysis, the website publisher computers may analyze a website associated with the received advertisement to ascertain a product or service associated with the advertisement.

In certain further embodiments, the website publisher computers may use a third party service for identification of a product or service associated with the advertisement. Such third party services may use, for example, a human to ascertain the product or service associated with the advertisement. In this case, the advertisement may be transmitted to a computing device associated with the third party service. That computing device may render the advertisement on a user interface of the computing device and an individual may view the advertisement and determine a product and/or service associated with that advertisement. An indication of the product or service may be transmitted by the computing device associated with the third party service to the website publisher computers.

Once a product or service associated with the advertisement has been identified, the website publisher computers may store the association of that advertisement with the product or service in a product or service association database such as in a memory or an external database communicatively coupled to the website publisher computer. When the advertisement for which the product or service has been identified is to be rendered again to a user, the website publisher computers may identify the product or service associated with the advertisement by accessing the database in which the website publisher computers has stored the association of the advertisement with the product or service. In this way the website publisher computers may relatively quickly ascertain the association between a product or service with the advertisement that it receives from the advertisement server computers. This process may enable relatively rapid identification of the product or service associated with the advertisement when the website publisher computers have received that same advertisement before. The association of the product or service with the advertisement may be enabled by an identifier associated with the advertisement. The advertisement may be referenced within the product or service association database by the identifier of the advertisement. In some cases, the identifier of the advertisement may be a unique identifier. Furthermore, the unique identifier of the advertisement may be determined by performing a hash of the advertisement to generate a fixed length identifier of the advertisement.

In certain embodiments, the website publisher computers may identify more than one product or service associated with a received advertisement. In this case the website publisher computers may select and/or identify one or more of the plurality of products or services associated with the advertisement for providing e-commerce functionality to the user based at least in part upon one or more user preferences and/or user characteristics. These user preferences and/or user characteristics may be based at least in part upon prior interaction of a particular user with the website publisher computers via his or her user device.

The website publisher computers may further be configured to generate e-commerce functionality associated with the product(s) or service(s) associated with the advertisement, or a subset thereof. The e-commerce functionality may be generated in the form of any suitable instructions or code that may provide an identifier of the product or service and/or a user interaction region on or around the advertisement when rendered on a user device to the user. For example, the website publisher computers may be configured to generate HTML code for rendering an identifier such as the name of an identified product or service and/or a user interaction region associated with a received advertisement from the advertisement server computers.

The one or more user interaction regions of the e-commerce functionality, when rendered on the user device, allows a user to select at least one of the one or more user interaction region. Responsive to selecting a user interaction region, the user device may generate and transmit an indication of the selection to the website publisher computers. The website publisher computers may receive the indication of that selection from the user device and may initiate an e-commerce process of a product or service associated with the selected user interaction region. Therefore, a user interaction region may enable a user to purchase a product or service that is associated with the advertisement that is rendered on his or her user device. In the same or other embodiments, the e-commerce functionality may allow the user to rent a product or service, add a product or service to a checkout cart, and/or add a product or service to a wish list.

If the user selects a user interaction region, such as a user interaction region labeled "buy now," the indication of the same may be transmitted from the user device to the website publisher computer. The website publisher computers may be configured to receive the indication of the selection of the user interaction region corresponding to buying the product or service associated with the advertisement. Upon receiving an indication of the selection of the user interaction region, the website publisher computers may generate a message that may be transmitted to an e-commerce computer or may itself instantiate an e-commerce functionality, such as sale of the product or service corresponding with the selected user interaction region and associated with the advertisement.

As discussed above, in certain embodiments, there may be more than one product or service associated with the advertisement received by the website publisher computers the advertisement server computer. In this case, the website publisher computers may utilize user preference and/or user characteristics, such as user preferences ascertained from a variety of user behavior history and/or demographics, to select one or more of a plurality of products or services with which e-commerce functionality may be provided in conjunction with the advertisement. For example if a particular user is known, based at least in part upon his or her preferences and characteristics, to prefer a certain product over another product then e-commerce functionality associated with the user's preferred product may be provided in association with the advertisement when rendered on the user's user device.

Referring now to FIG. 1, an interaction chart illustrating an example interaction for providing an advertisement with associated e-commerce functionality is depicted in accordance with embodiments of the disclosure. As shown in this architecture 100 there may be one or more users 110 that may interact with one or more user devices 120. In some cases a single user may interact with multiple user devices. In other cases multiple users 110 may interact with a single user device 120. And in yet other cases, each user device 120 may have a single user 110 associated therewith. The user devices 120 may be any suitable user device 120 that a user 110 may use to access one or more websites, such as by executing a web browser on the user device 120. These user devices 120 may include, but not be limited to, a smart phone, a tablet computing device, a laptop computer, a netbook computer, a desktop computer, a web-enabled television, a personal digital assistant, an e-book reader, or combinations thereof. The architecture 100 may further include one or more website publisher computers 130. The architecture 100 may yet further include one or more advertisement server computers 140.

As depicted, a user device 120, responsive to interactions with the user 110, may request content from the one or more website publisher computers 130, depicted as 150. The content may include any one of a website, images, audio, video, media, or combinations thereof. The website publisher computers 130 may be configured to receive the content request. The content request 150 may be transmitted via one or more networks in the form of one or more data packets from the user device 120 to the website publisher computers 130. The one or more data packets may include a payload in addition to transmission overhead, such as headers, including transmission address(es), and other overhead associated with transmission integrity checks, such as cyclical redundancy checks (CRC) or parity bit check.

Responsive to receiving the content request 150 from the user device 120, the website publisher computers 130 may request advertisement from the one or more advertisement server computers 140. The request for advertisement 160 may also be in the form of one or more data packets and may be transmitted via one or more network connections, such as open network connections or dedicated network connections between the website publisher computers 130 and the advertisement server computers 140. The request for advertisement 160 may, in certain embodiments, include specific identifiers of advertisements that may be requested by the website publisher computers 130. In other cases, the website publisher computers 130 may provide some indication of types of advertisements within the request for advertisement 160 transmitted to the advertisement server computers 140. These types of advertisements may include product or service types that may be of interest to the user 110 requesting content via his or her user device 120. In yet other embodiments, the website publisher computers 130 may incorporate an identifier of the user 110 in the request for advertisement 160 transmitted to the advertisement server computers 140. Further still, in other embodiments, the request for advertisement 160 may not include any information associated with the user 110 or any preferences for advertisement provided by the website publisher computers 130.

The advertisement server computers 140, upon receiving the request for advertisement 160 from the website publisher computers 130, may provide an advertisement 170 to the website publisher computers 130. The advertisement provided may comply with one or more requests associated with the request for advertisement 160 as provided by the website publisher computers 130 to the advertisement server computers 140. These requests may be for specific advertisements, specific types of advertisements, or a determination of appropriate advertisements based upon user information such as user preferences, user characteristics, or based upon requested content. In certain embodiments, the advertisement server computers 140 may interact with one or more other entities, such as an advertisement exchange or real time bidding server that may provide real time pricing for advertisements. The advertisements that may be provided may include a variety of elements associated therewith. In certain embodiments, the advertisement may include one or more image files, one or more audio files, one or more video files, and/or one or more text incorporated therein.

The advertisement may further include metadata and/or applications such as JavaScript snippets associated therewith and transmitted along with the advertisement. This metadata or application may include one or more identifiers of the advertisement and/or one or more identifiers of one or more products or services associated with the advertisement, such as products or services that may be advertised in the advertisement. The advertisement may be transmitted via a network or dedicated communicative connections between the advertisement server computers 140 and the website publisher computers 130. The advertisement may be transmitted as one or more data packets. The data packets may include transmission overhead and/or transmission integrity checks associated with the transmission of the advertisement from the advertisement server computers 140 to the website publisher computers 130. The one or more data packets may further include one or more payloads associated with each of the one or more data packets. The one or more payloads may include the content of the advertisement, such as images, audio or text associated with the advertisement. The payloads may further include the metadata, such as identifiers of products and/or services associated with the advertisement. Further still, the payloads of the one or more data packets associated with the advertisement may include one or more applications that may identify products and/or services associated with the advertisement.

Upon receiving the advertisement from the advertisement server computers 140, the website publisher computers 130 may ascertain one or more products or services associated with the advertisement. As mentioned above, a variety of mechanisms may be utilized to determine the product or service associated with the advertisement. This may include image analysis, text analysis, third party identification mechanism, and/or a click-through method. If the advertisement had been linked with one or more products or services when received previously by the website publisher computers 130, then the website publisher computers 130 may be configured to access a lookup table or database that has a correspondence of the advertisement to one or more associated products or services.

Upon determining the one or more products or services associated with the advertisement, the website publisher computers 130 may generate e-commerce functionality associated with at least one of the one or more products or services associated with the advertisement. In cases where there may be multiple products or services associated with the advertisement, the website publisher computers 130 may select and/or identify a subset of those multiple products or services based at least in part on user preferences and/or user characteristics, such as information associated with earlier user purchases, user demographics, and/or interactions with other advertisements. Upon selecting a subset of multiple products or services associated with the advertisement, the website publisher computers 130 may generate e-commerce functionality corresponding to each of the selected products or services associated with the advertisement. The e-commerce functionality may enable the user 110 to interact with the e-commerce functionality, such as on his or her user device 120, to initiate and/or instantiate a purchase of products or services for which e-commerce functionality is generated.

The e-commerce functionality may generate one or more elements that may be rendered along with the content and the advertisement on the user device that enables the user to initiate a transaction such as a purchase associated with at least one of the one or more products or services for which e-commerce functionality is provided. The e-commerce functionality may include identifiers of one or more products or services that may be offered for sale. The e-commerce functionality may further include one or more user interaction regions which may be selected by a user when rendered on the user device to commence or instantiate a purchase of one or more products or services associated with the advertisement. In certain embodiments, the e-commerce functionality may include incentives, such as coupons or indications of promotions, such as announcements of price discounts and/or product or service related events. The generation of the e-commerce functionality may involve generation of computer code that may display attributes or identification of the products or services, as well as computer code that may display the user interaction regions associated with products or services that are offered for sale using the e-commerce functionality. This code may include, for example, a variety of suitable codes and/or instructions that may be used to render objects on websites including, but not limited to, any variety of extensible markup languages (XML), such as hypertext markup language (HTML). Therefore, in certain embodiments, the website publisher computers 130 may generate HTML code associated with the advertisement and to generate the e-commerce functionality associated with the advertisement.

Upon generation of the e-commerce functionality, the website publisher computers 130 may transmit the content, the advertisement, and the associated e-commerce functionality 180 to the user device 120 for rendering to the user 110. In some cases, the e-commerce functionality may be incorporated with the advertisement and, in other cases, the e-commerce functionality may be transmitted by the website publisher computers 130 to the user device 120 as a separate and distinct set of instructions and/or code to be rendered with the advertisement.

Figure 2:
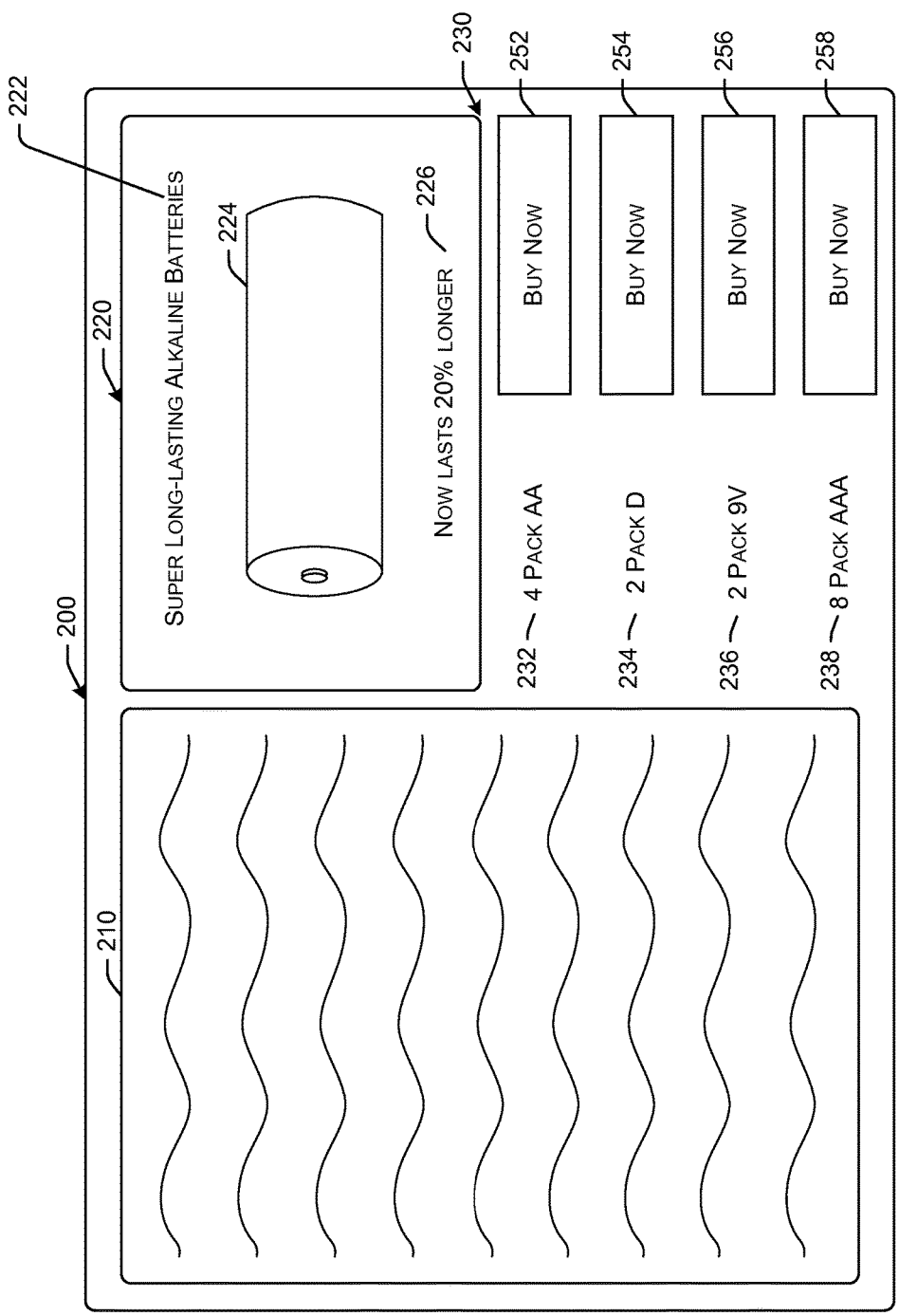
FIG. 2 is simplified schematic diagram of an example user interface rendering an advertisement with e-commerce functionality, in accordance with embodiments of the disclosure.

Referring now to FIG. 2, an example user interface 200 depicting content 210, an advertisement 220 and associated e-commerce functionality 230. The content may be content requested by the users 110 via his/her user device 120. As depicted here the content 210 is shown on one portion of the user interface 200, but may be depicted in any suitable location of the user interface 200. The advertisement may be received by the website publisher computers 130 from the advertisement server computers 140 responsive to advertisement request. It will be appreciated that although a side advertisement 220 is depicted here, the advertisement may be of any form as discussed above. The advertisement 220 may include various elements including an introduction of the product or service 222, an image of the product 224 which, in this case, are super long-lasting alkaline batteries, and one or more text elements 226, such as a description of the product. The e-commerce functionality depicted on the user interface 200 on the user device 120 to the users 110 may include a variety of product descriptions 232, 234, 236, 238. In this case, the product descriptions may be various form factors of batteries associated with the advertisement 220. The e-commerce functionality 230 may further include one or more user interaction regions 252, 254, 256, 258 corresponding with respectively to product descriptions 232, 234, 236, 238. In this case, the user may be able to select one of the user interaction regions 252, 254, 256, 258 to commence purchase of the corresponding product associated with each of the user interaction regions 252, 254, 256, 258.

In certain embodiments, the products offered for sale as described by the product descriptions 232, 234, 236, 238 may be selected from a larger set of products or services that may be associated with the advertisement 220. In this case, the website publisher computers 130 may randomly select a subset of all of the products or services associated with the advertisement 220. In other embodiments, the website publisher computers 130 may select a subset of all of the products or services associated with the advertisement based upon one or more user preferences or user characteristics such as information related to previous user viewing history, previous user purchases or previous user interactions with the website publisher computers 130, or user demographic information. It will be appreciated that while the e-commerce functionality 230 is shown in proximity, such as underneath the advertisement 220 on the user interface 200, the e-commerce functionality 230 may be displayed at any appropriate location on the user interface 200. For example the e-commerce functionality 230 may overly the advertisement 220 in certain embodiments. In other embodiments, the e-commerce functionality 230 may be in proximity on any side of the advertisement 220. Further still in certain embodiments, the e-commerce functionality may be on multiple sides and/or overlying the advertisement 220.

Illustrative Architecture

Figure 3:
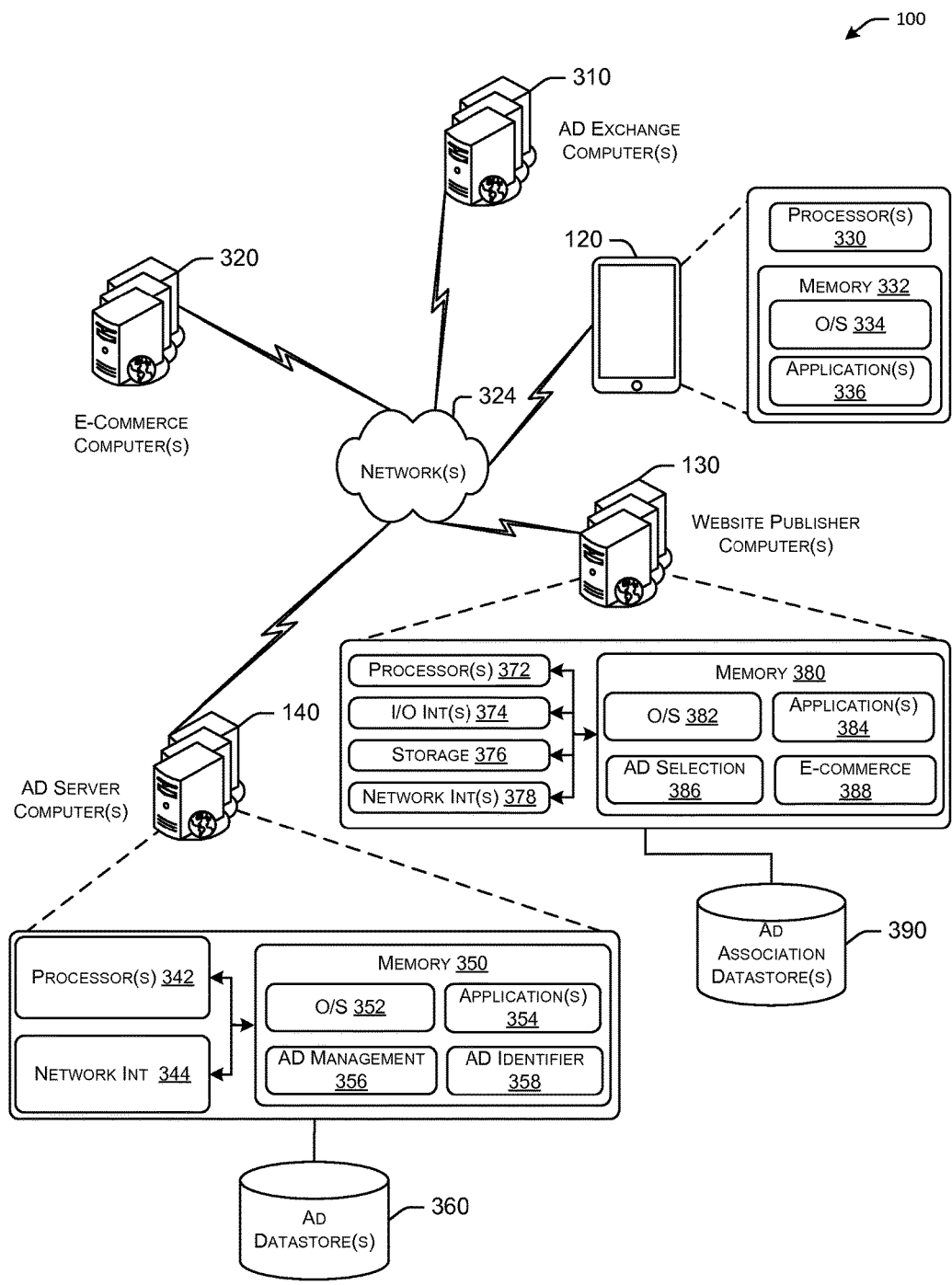
FIG. 3 is a simplified schematic diagram illustrating an example architecture for providing advertisements with e-commerce functionality in accordance with illustrative embodiments of the disclosure.

Referring now to FIG. 3, an example implementation of the architecture 100 for providing advertisement with associated e-commerce functionality in accordance with embodiments of the disclosure is depicted. As shown, user device 120 may be communicatively coupled to the website publisher computers 130 and the advertisement server computers 140 via one or more networks 324. The architecture 100 may further include one or more advertisement exchange computers 310 and/or one or more e-commerce computers 320. In certain embodiments, the website publisher computers 130 may be configured for functionality for serving website content as well as provide e-commerce functionality. In other embodiments, the website publisher computers 130 may not include e-commerce functionality.

In these cases the website publisher computers 130 may cooperate such as via networks 324 with the e-commerce computers 320 to initiate one or more transactions such as purchase of products or services.

In some examples, the networks 324 may include any one or a combination of different types of suitable communications networks, such as cable networks, the Internet, wireless networks, cellular networks, and other private and/or public networks. Furthermore the networks 324 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. While the illustrated example represents the user devices 120 accessing content over the networks 324, the described techniques may equally apply in instances where the user devices 120 interact with the website publisher computers 130 via the one or more user devices 120 over a landline phone, via a kiosk, or in any other manner. It is also noted that the described techniques may apply in other client/server arrangements (e.g., set-top boxes, etc.), as well as in non-client/server arrangements (e.g., locally stored software applications, etc.).

The user devices 120 may include one or more processors 330 and one or more memories 332. In some examples, the processors 330 of the user device 120 may be implemented as appropriate in hardware, software, firmware, or combinations thereof. Software or firmware implementations of the processors 330 may include computer-executable or machine-executable instructions written in any suitable programming language to perform the various functions described. Hardware implementations of the processors 330 may be configured to execute computer-executable or machine-executable instructions to perform the various functions described. The one or more processors 330 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 120 may also include a chipset (not shown) for controlling communications between the one or more processors 330 and one or more of the other components of the user device 120. The one or more processors 330 may also include one or more application specific integrated circuits (ASICs) or application specific standard products (ASSPs) for handling specific data processing functions or tasks.

The memory 332 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 332 may store program instructions that are loadable and executable on the processor(s) 330, as well as data generated or received during the execution of these programs. Turning to the contents of the memory 332 in more detail, the memory 332 may include one or more operating systems (O/S) 334 and an applications module 336. Each of the modules and/or software may provide functionality for the user device 120, when executed by the processors 330. The modules and/or the software may or may not correspond to physical locations and/or addresses in memory 330. In other words, the contents of each of the modules 334, 336 may not be segregated from each other and may, in fact be stored in at least partially interleaved positions on the memory 330.

The operating system module 334 may have one or more operating systems stored thereon. The processors 330 may be configured to access and execute one or more operating systems stored in the operating system module 334 to operate the system functions of the electronic device. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application module 336 may contain instructions and/or applications thereon that may be executed by the processors 330 to provide one or more services to the user. These instructions and/or applications may, in certain aspects, interact with the operating system module 334 and/or other modules of the user device 120. The applications module 336 may include instructions and/or applications therein that when executed by processors 330 enable the user device 120 to perform a variety of functions associated with user 110 interactions. These applications may enable the rendering of content on the user device 120 to the users 110 associated with the user device 120. The applications and certain embodiments may control one or more input/output devices such as touch panels, displays, microphones, sensors or speakers of the user device 120.

In certain embodiments, the applications module 336 may include applications such as a web browser that enables the user device 120 to render one or more websites thereon and allows the user 110 to interact with the rendered website. These web browsers may provide functionality to request content based upon user interaction from the website publisher computers 130 and may further be configured to receive content, advertisements and e-commerce functionality from the website publisher computers such as via networks 324 or other suitable communicative connections and render the same on the user device 120.

The advertisement server computers 140 may include a variety of components including processors 342, network interfaces 344, and memory 350. The advertisement server computers 140 may further be communicatively coupled to advertisement datastore 360 which may store advertisements that the advertisement server computers 140 may be configured to access and/or provide to other entities of architecture 100, such as the website publisher computers 130. The processors 342 may be similar to processors 330 of the user device 120 and in the interest of brevity, the descriptions of the same will not be repeated here. The network interfaces(s) 344 may allow the advertisement server computers 140 to communicate via network 324 and/or via other communicative channels. For example, the advertisement server computers 140 may be configured to communicate with stored databases, other computing devices or servers, user terminals, other devices on the networks 324 and/or repositories of advertisements.

Turning now to the memory 350 of the advertisement server computers 140 a variety of modules may be stored thereon, including an operating system module 352, an applications module 354, an advertisement management module 356, and an advertisement identifier module 358. Each of the modules and/or software may provide functionality for the advertisement server computers 140, when executed by the processors 342. The modules and/or the software may or may not correspond to physical locations and/or addresses in memory 350. In other words, the contents of each of the modules 352, 354, 356, 358 may not be segregated from each other and may, in fact be stored in at least partially interleaved positions on the memory 350.

The operating system module 352 may have one or more operating systems stored thereon. The processors 342 may be configured to access and execute one or more operating systems stored in the operating system module 352 to operate the system functions of the electronic device. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like. The application module 354 may contain instructions and/or applications thereon that may be executed by the processors 342 to provide one or more services to the advertisement server computers 140. These instructions and/or applications may, in certain aspects, interact with the operating system module 352 and/or other modules of the advertisement server computers 140.

The advertisement management module 356 may include instructions thereon that when executed by processors 342 enable the processors 342 to perform a variety of advertisement management processes. The processors 342 may be configured to receive one or more advertisements and store those advertisements in any suitable storage medium such as the memory 350 or the advertisement datastore 360. The advertisement management module 356 may further include instructions that when executed by processors 342 configure the processors 342 to provide a registry of advertisements that are available for providing to website publisher computers 130. This registry may include information such as information related to entities associated with the advertisements, monetary amount such as prices paid for serving the advertisement, and the type of advertisement.

The processors 342 may further be configured to access advertisements stored in the advertisement database 360 and provide those advertisements to other entities of the architecture 100 such as the website publisher computers 130. Therefore, the processors 342 may be configured to receive an advertisement request and process the advertisement request by executing instructions stored in the advertisement management module 356. Upon receiving an advertisement request the processors 342 may further be configured to identify a suitable advertisement and transmit that advertisement to the website publisher computers 130 responsive to the advertisement request. In certain embodiments, the advertisement server computers 140 and the processors 342 thereon may cooperate with one or more other entities of architecture 100 such as the advertisement exchange computers 310 to identify advertisements that may be served to the website publisher computers 130. The instructions executed by the processors 342 to facilitate this cooperation with other entities such as the advertisement exchange computers 310 may be stored in the advertisement management module 356. The processors 342 may further be configured to receive recommendations for advertisement from the advertisement exchange computers 310. These recommendations may be based at least in part on the demand for various types of advertisements, the current pricing offered for rendering various advertisements, and/or information related to the user 110 to whom the advertisement will be rendered.

The advertisement identifier module 358 may include instructions stored thereon that when executed by processors 342 enable the advertisement server computers 140 to perform a variety of advertisement identification processes, such as assigning identifiers to advertisements and/or associating advertisements with one or more products or services. The processors 342 may be configured to use a variety of methods to identify a product or service associated with an advertisement including textual analysis, image analysis or identifier and/or metadata provided by the advertiser. In certain embodiments, the processors 342 may be configured to append metadata and or applications to advertisements based at least in part on one or more products or services associated with that advertisement. The metadata and/or applications may provide an identification of the one or more products or services associated with the advertisement. Therefore, when an advertisement is transmitted by the advertisement server computers 140 to other entities of architecture 100 such as the website publisher computers 130, the advertisement may be transmitted along with metadata or applications that identify one or more products or services associated with that advertisement. In certain embodiments, the processors 342 may receive information associated with products or services associated with particular advertisements from other entities of architecture 100 such as the advertisement exchange computers 310. In these cases the advertisement server computers may further provide metadata or applications with those particular advertisements that provide an indication of the one or more products or services associated with that advertisement.

It will be appreciated that there may be overlap in the functionality of the instructions stored in the operating system module 352, the applications module 354, the advertisement management module 356, and the advertisement identifier module 358. In fact, the functions of the aforementioned modules 352, 354, 356, 358 may interact and cooperate seamlessly under the framework of the user device 120. Indeed, each of the functions described for any of the modules 352, 354, 356, 358 may be stored in any module 352, 354, 356, 358 in accordance with certain embodiments of the disclosure. Further, in certain embodiments, there may be one single module that includes the instructions, programs, and/or applications described within the operating system module 352, the applications module 354, the advertisement management module 356, and the advertisement identifier module 358.

The website publisher computers 130 may have one or more processors 372, one or more input/output I/O interfaces 374, storage drivers 376, network connections 378 and one or more memories 380. The processors 372 of the website publisher computers 130 may be implemented as appropriate in hardware, software, firmware, or combinations thereof. Software or firmware implementations of the processors 372 may include computer-executable or machine-executable instructions written in any suitable programming language to perform the various functions described. Hardware implementations of the processors 372 may be configured to execute computer-executable or machine-executable instructions to perform the various functions described. The one or more processors 372 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The website publisher computers 130 may also include a chipset (not shown) for controlling communications between the one or more processors 372 and one or more of the other components of the user device 110. The one or more processors 372 may also include one or more application specific integrated circuits (ASICs) or application specific standard products (ASSPs) for handling specific data processing functions or tasks.

The input/output (I/O) interface(s), such as human machine interfaces (HMI), may be controlled via the one or more I/O interfaces 374. The one or more storage drivers 376 may enable communications with one or more external storage devices and/or databases, such as a advertisement association datastore 390, as illustrated. The network interfaces(s) 378 may allow the website publisher computers 130 to communicate via network 324 and/or via other communicative channels.

The memory 380 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 380 may store program instructions that are loadable and executable on the processor(s) 372, as well as data generated or received during the execution of these programs. The memory 380 may include a variety of modules such as an operating system module 382, an applications module 384, an advertisement selection module 386, and an e-commerce module 388. Each of the modules and/or software may provide functionality for the website publisher computers 130, when executed by the processors 372. The modules and/or the software may or may not correspond to physical locations and/or addresses in memory 380. In other words, the contents of each of the modules 382, 384, 386, 388 may not be segregated from each other and may, in fact be stored in at least partially interleaved positions on the memory 380.

The operating system module 382 may have one or more operating systems stored thereon. The processors 372 may be configured to access and execute one or more operating systems stored in the operating system module 382 to operate the system functions of the electronic device. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like. The application module 384 may contain instructions and/or applications thereon that may be executed by the processors 372 to provide one or more services to the website publisher computers 130. These instructions and/or applications may, in certain aspects, interact with the operating system module 382 and/or other modules of the website publisher computers 130.

The advertisement selection module 386 may have instructions stored thereon that when executed by processors 372 may enable the website publisher computers 130 to provide a variety of advertisement selection functionality. The processors 372 may be configured to generate an advertisement request and transmit the advertisement request via one or more networks 324 to another entity of architecture 100 such as the advertisement server computers 140. The processors 372 may further be configured to receive one or more advertisements via the networks 324 or other suitable communicative links from one or more other entities of architecture 100 such as the advertisement server computers 140. The advertisement selection module 386 may further include instructions that when executed by the processors 372 enable the website publisher computers 130 to provide information associated with selection of an advertisement based at least in part on one or more user characteristics or user preferences. These user characteristics or user preferences may be associated with the user 110 that requests content from the website publisher computers 130 via his or her user device 120.

The e-commerce module 388 may have instructions stored therein that when executed by processors 372 enable the website publisher computers 130 to perform a variety of e-commerce related functionality. In one aspect the processors 372 may be configured to generate e-commerce functionality associated with an advertisement that is received by the website publisher computers 130. In another aspect the e-commerce module may enable and the instructions stored thereon may enable the processors 372 to ascertain one or more products or services associated with a received advertisement. The processors 372 may further store associations of products and services to advertisements in a repository such as in the memory 380 or an external database such as the advertisement association database 390. The e-commerce module 388 may include instructions that enable the identification of the received advertisement by a variety of mechanisms including but not limited to click through analysis, analysis of metadata or applications associated with the advertisement and received via networks 324 or other suitable communicative links, image analysis or third party analysis of the advertisement. The processors 372 by executing instructions stored in the e-commerce module 388 may further generate one or more e-commerce functionality such as functionality that when rendered on a user device 120 displays one or more identifications of the one or more products or services associated with an advertisement. The e-commerce functionality may further include displaying one or more user interaction regions that may be selected by a user 110 on his or her user device 120 when rendered on the user device 120. This e-commerce functionality may be generated as a variety of code such as XML code and/or HTML code. The e-commerce functionality may be incorporated with the advertisement in certain embodiments. In other embodiments the e-commerce functionality may be a separate set of code than the data associated with the advertisement. The e-commerce functionality is generated by the processors 372 when transmitted to the user device 120 and rendered thereon may provide the e-commerce functionality to the user 110 in regions that are in proximity of the advertisement or overlaying the advertisement. In certain embodiments the e-commerce functionality may be displayed in regions that are not in proximity of the displayed advertisement.

It will be appreciated that there may be overlap in the functionality of the instructions stored in the behavior recognition module 222, the display control module 226, the scrolling control module 230, and/or the profile management module 234. In fact, the functions of the aforementioned modules 222, 226, 230, 234 may interact and cooperate seamlessly under the framework of the user device 110. Indeed, each of the functions described for any of the modules 222, 226, 230, 234 may be stored in any module 222, 226, 230, 234 in accordance with certain embodiments of the disclosure. Further, in certain embodiments, there may be one single module that includes the instructions, programs, and/or applications described within the behavior recognition module 222, the display control module 226, the scrolling control module 230, and/or the profile management module 234.

Illustrative Processes

Figure 4:
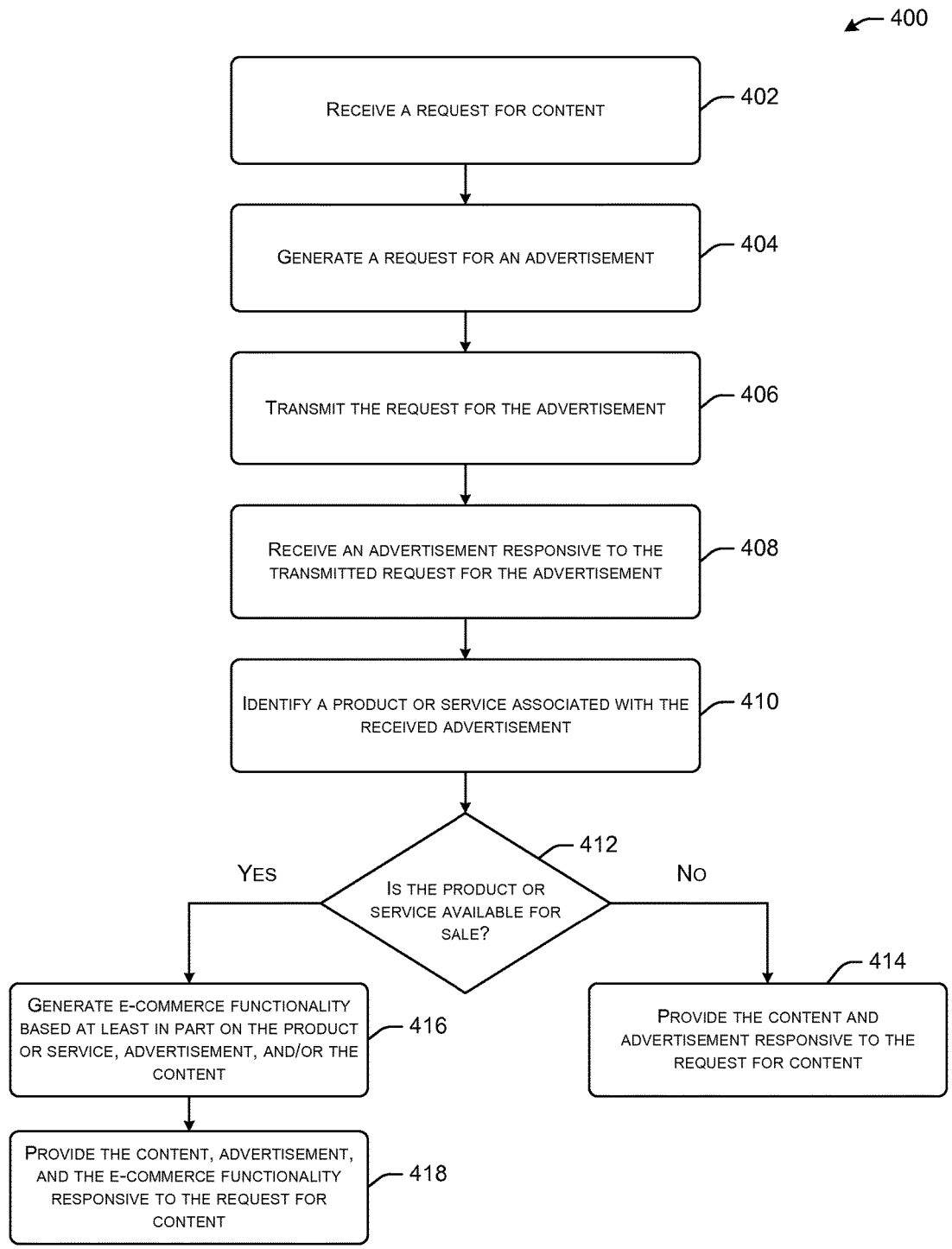
FIG. 4 is a flow diagram illustrating an example method for providing advertisement and e-commerce functionality, in accordance with illustrative embodiments of the disclosure.

Referring now to FIG. 4, an example method 400 for providing e-commerce functionality in accordance with embodiments of the disclosure is depicted. This method 400 may be performed by the website publisher computers 130 or other entities of architectural 100. In certain embodiments the example method 400 may be performed by the website publisher computers 130 in cooperation with one or more entities of architectural 100.

At block 402 a request for content may be received. The request for content may be received by the website publisher computers 130 from a user device 120 based upon user interaction with the user device 120 via one or more networks 324 or other communicative links. The request for content may be in the form of one or more data packets that may include a payload based at least in part on an identifier for the requested content, as well as overhead, such as headers for directing the data packets and/or various transmission integrity checks.

At block 404, responsive to receiving the request for content, a request for advertisement may be generated. This request for advertisement in certain embodiments may be based upon one or more user preferences as determined from one or more user parameters and/or characteristics. Alternatively, the request for advertisement may be generated based at least in part on the content requested and yet other embodiments the request for advertisement may not include any user or content based information. At block 406, the request for advertisement may be transmitted. In this case, the request for advertisement may be transmitted via the one or more networks 324 or other suitable communicative connections to the advertisement server computers 140.

At block 408, an advertisement may be received responsive to the transmitted request for advertisement. The advertisement may be received from the advertisement server computers 140 via the one or more networks 324 or other suitable network links such as a direct link between the advertisement server computers 140 and the website publisher computers 130. In certain embodiments, the advertisement may have metadata or applications embedded therewith or transmitted therewith that indicate one or more products or services associated with the advertisement. In other embodiments the advertisement may be transmitted by the advertisement server computers 140 and received by the website publisher computers 130 and may not have any indication of products or services associated therewith.

At block 410, a product or service associated with the advertisement may be identified. The identification of the product or service associated with the advertisement may involve the processors 372 identifying an identifier associated with the advertisement and accessing one or more repositories of product or service associations with the advertisement such as a repository stored in memory 380 or in the advertisement association datastore 390. If the product or service association with the advertisement is not stored in an accessible repository of product or service associations then a variety of other mechanisms may be used by the processors 372 to determine a product or service associated with the advertisement. These mechanisms may include image analysis of the advertisement. In image analysis of the advertisement, images associated with the advertisement may be analyzed using a variety of algorithms by the processors 372 or other entities to determine if the images provide an indication of a product or service associated with the advertisement. Alternatively or additionally, the processors 372 may perform an advertisement click-through analysis based upon one or more addresses or links to websites associated with the advertisement. Further still, the processors 372 may provide the advertisement to a third party service that may provide identification of the advertisement. Such services may use humans, in some cases, in determining the association of products or services of the advertisement. In the same or other cases, the third party service may use crowd sourcing to identify the product or service associated with the advertisement. This may entail displaying the advertisement on one or more web pages and soliciting viewers of those web pages to provide an identification of the product or service associated with the advertisement.

It will be appreciated that in some cases, one or more products or services identified to be associated with the advertisement may be products or services that are not explicitly advertised in the advertisement. For example, smart phone covers and/or belt clips may be identified as an associated product for an advertisement that advertises a smart phone.

At block 412, a determination may be made of whether the product or service associated with the advertisement is available for sale. This determination may be made based at least in part in the processors 372 accessing a database of products or services that may be available for sale and comparing the one or more products or services associated with the advertisement to that database. In certain other embodiments, the processors 372 of the website publisher computers 130 may transmit an identification of the one or more products or services associated with the advertisement to an e-commerce computer 320 for determining whether those products or services or available for sale. In some of these cases, the website publisher computers 130 may not be equipped for e-commerce functionality such as selling products or services. Therefore, the website publisher computers 130 may not have direct access to databases that indicate whether products or services are available for sale. In other cases, the website publisher computers 130 are e-commerce capable and may be used for the purposes of selling products or services. In these cases, the databases associated with determining the availability of products or services for sale may be accessible directly by the website publisher computers 130.

If at block 412, it is determined that the product or service is not available for sale then at block 414, the content and the advertisement may be provided by the website publisher computers 130 responsive to the request for content. In this case, the content such as the content requested by the user device 120 as well as the advertisement as received by the website publisher computers may be transmitted via the one or more networks or other suitable communicative links to the user device 120. If, however, at block 412 it is determined that the product or service is available for sale then at block 416 an e-commerce functionality based at least in part on the product or service advertisement and/or the content may be generated. The e-commerce functionality may be generated as code such as XML or HTML code that may be incorporated with the advertisement or in other cases provided as a separate module from the advertisement.

At block 418, the content, the advertisement and the e-commerce functionality may be provided by the website publisher computers. The website publisher computers 130 may transmit the content advertisement and the e-commerce functionality via the one or more networks 324 to user devices 120 for rendering to users 110.

It should be noted, that the method 400 may be modified in various ways in accordance with certain embodiments of the disclosure. For example, one or more operations of the method 400 may be eliminated or executed out of order in other embodiments of the disclosure. Additionally, other operations may be added to the method 400 in accordance with other embodiments of the disclosure.

Figure 5:
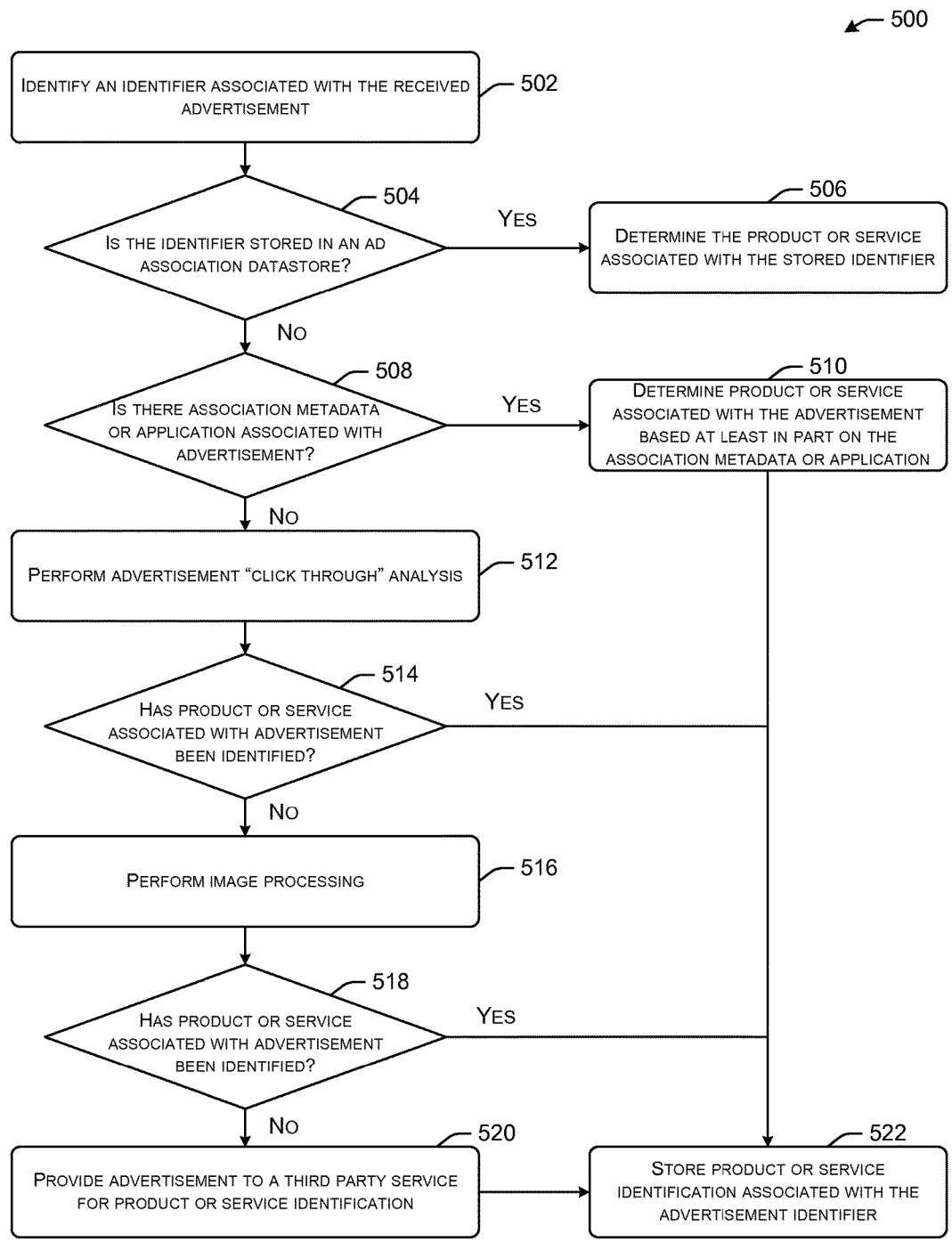
FIG. 5 is a flow diagram illustrating an example method for identifying a product or service associated with an advertisement, in accordance with illustrative embodiments of the disclosure.

Referring now to FIG. 5, an example method 500 for determining a product or service associated with a received advertisement is in accordance with embodiments of the disclosure is depicted. Method 500 may be performed by the website publisher computers 130 in cooperation with one or more other entities of architecture 100. Example method 500 may be a particular implementation of block 410 of example method 400 as depicted in FIG. 4.

At block 502, an identifier associated with the received advertisement may be identified. The identifier may be part of metadata and/or application(s) associated with the received advertisement. In other alternative cases the identifier may be transmitted separately from the advertisement by the advertisement server computers 140.

At block 504, it may be determined if the identifier associated with the advertisement is in the advertisement association datastore 390. If the identifier is in the advertisement association datastore 390, then at block 506, the product or service associated with the received advertisement may be determined based at least in part on the advertisement association datastore 390. In certain embodiments, the processors 372 may access the advertisement association datastore 390 and identify the identifier associated with the received advertisement and determine one or more products or services associated with that advertisement based upon the identifier of the advertisement.

At block 504, if it determined that the identifier is not in the advertisement association datastore 390, then at block 508, it may be determined if there is association metadata or applications associated with the advertisement. The association metadata or application may indicate one or more products or services associated with the advertisement. In certain embodiments the metadata or applications for association of products or services with the advertisement may be incorporated with the advertisement by the advertisement server computers 150 prior to transmitting the advertisement to the website publisher computers 130. If at block 508 it is determined that association metadata or applications associated with the advertisement are present, then at block 510 one or more products or services associated with the advertisement may be determined based at least in part on the association metadata or application.

If, however, at block 508 it is determined that association metadata or applications are not associated with the advertisement, then at block 512 a click-through analysis may be performed on the advertisement. The click-through analysis may entail the processors 372 of the website publisher computers 130 determining one or more addresses and/or links associated with the advertisement and accessing websites or other content associated with those addresses or links. Upon accessing websites or content associated with addresses or links incorporated in the received advertisement, the processors 372 may be configured to determine one or more products or services associated with the advertisement. For example, if a click-through analysis is performed and the website publisher computers 130 access a website associated with a particular product, then the website publisher computers 130 and the processors 372 thereon may be configured to determine that that particular product is associated with the advertisement received by the website publisher computers 130.

At block 514 it may be determined if a product or service has been identified associated with the advertisement. If a product or service has not been identified with the advertisement, then an image processing function may be performed at block 516. The image processing may entail the processors 372 analyzing pixels and/or groups of pixels associated with images incorporated in the advertisement to determine one or more products or services associated with the advertisement. In certain cases the images associated with the advertisement may be parsed by the processors 372 to determine if text or writing is incorporated therein. The text or writing may be identified and used to determine the one or more products or services associated with the advertisement. In other cases, images of the product or service associated with the advertisement may be filtered from the rest of the advertisement and compared to a data base of images that may indicate the product or service associated with the advertisement. In some cases, the advertisement may include text and the advertisement text may be analyzed by the processors 372 to determine the product or service associated with the advertisement. The text analysis may involve optical character recognition (OCR), intelligent character recognition, or the like.

At block 518 it may be determined whether the product or service associated with the advertisement has been identified. If the product or service has not been identified then at block 520 the advertisement may be provided to a third party service for identification of the product or service associated therewith. This third party service may be one that uses humans to look at the advertisement and make an assessment of one or more products associated with the advertisement. In the same or other cases, the third party service may use crowd sourcing to identify the product or service associated with the advertisement. This may entail displaying the advertisement on one or more web pages and soliciting viewers of those web pages to provide an identification of the product or service associated with the advertisement. Upon identification of the one or more products or services the third party service may transmit an indication of that one or more products or services associated with the advertisement to the website publisher computers 130 after any of the processes of blocks 510, 512, 516 and/or 520. If the one or more products or services associated with the advertisement are identified, then at block 522 the advertisement association data base may be updated with the determined product or service association of the received advertisement to the identifier of that advertisement. If the advertisement did not come with an identifier then in certain embodiments the website publisher computers 130 may assign an identifier to the received advertisement.

It should be noted, that the method 500 may be modified in various ways in accordance with certain embodiments of the disclosure. For example, one or more operations of the method 500 may be eliminated or executed out of order in other embodiments of the disclosure. Additionally, other operations may be added to the method 500 in accordance with other embodiments of the disclosure.

Figure 6:
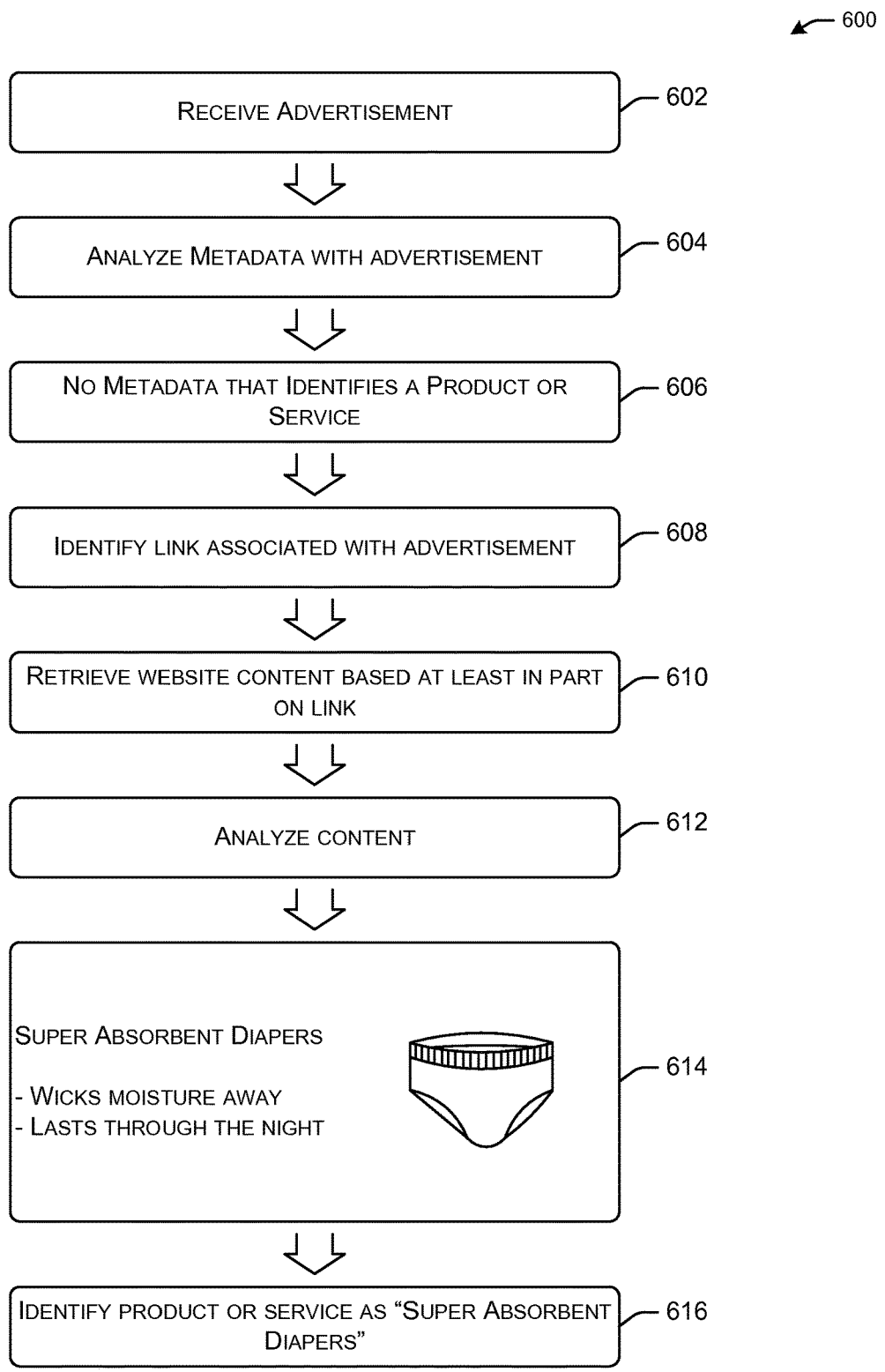
FIG. 6 is a flow diagram illustrating an example process of identifying a product or service by a click-through process, in accordance with illustrative embodiments of the disclosure.

Referring now to FIG. 6, an example method of identifying a product or service in accordance with embodiments of the disclosure is depicted. This method 600 may be performed by the website publisher computers 120. At block 602, an advertisement may be received with an advertisement identifier. At block 604, metadata received with the advertisement may be analyzed. The analysis of the metadata may be to determine if there is a product or service identified in the metadata received with the advertisement.

At block 606, it may be determined that no product or service related metadata is available with the advertisement. At block 608, an link, such as an HTML link, associated with the advertisement may be identified. Using this link at block 610 a website associated with the link may be accessed. At block 612, the website associated with the link may be analyzed. This website is depicted in block 614, where the website may have text and/or text images and/or audio associated therewith. Each of the elements of the website 614 may be analyzed to determine a product or service associated with the advertisement. At block 616, the product or service may be identified as super absorbent diapers by analyzing the website 614.

Figure 7:
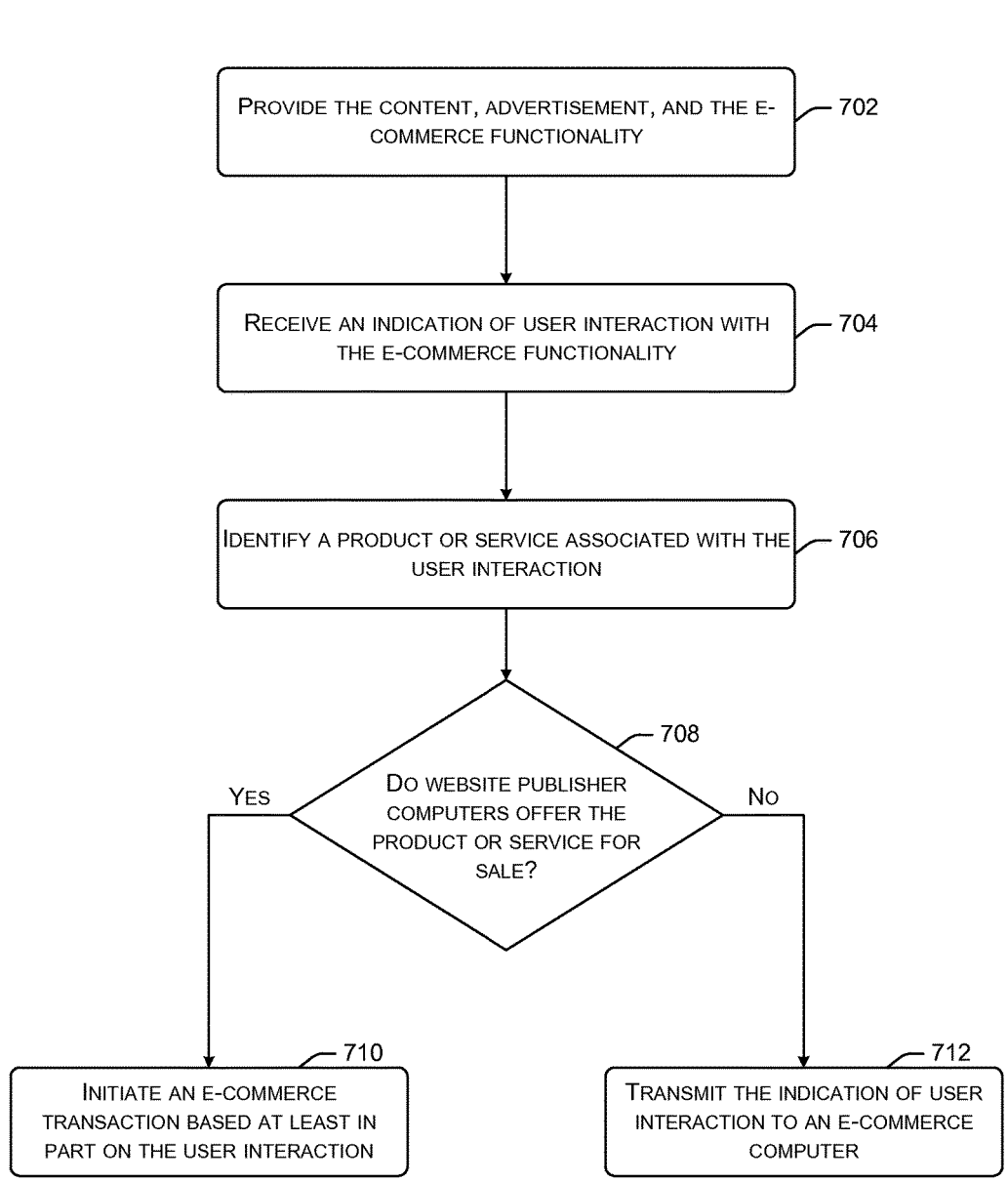
FIG. 7 is a flow diagram illustrating an example method for instantiating an e-commerce transaction, in accordance with illustrative embodiments of the disclosure.

Referring now to FIG. 7, an example method 700 for commencing an e-commerce transaction in accordance with embodiments of the disclosure is depicted. The method 700 may be performed by the website publisher computers 130 in cooperation with one or more other entities of architecture 100. At block 702, content, the advertisement, and the e-commerce functionality associated with the advertisement may be provided by the website publisher computers 130. The content, advertisement, and e-commerce functionality may be provided responsive to a request for content from a user device 120 with which a user 110 interacts.

At block 704, an indication of user interaction with the e-commerce functionality may be received. This user interaction may be on a user interface as rendered on the user device 120 and interacted with by the user 110. In certain embodiments the interaction may entail the user 110 selecting one or more user interaction regions on his or her user device 110. Responsive to the selection the user device 120 may transmit an indication of the user interaction with the e-commerce functionality which may be received by the website publisher computers 130 via the networks 324 or other suitable communicative links.

At block 706, a product or service associated with the user interaction may be identified. This identification may be performed by the website publisher computers 130. In certain embodiments the identification may be based at least in part on the received indication of user interaction with the e-commerce functionality. For example, if a user 110 selects a particular user interaction region on his or her user device 120 the user device 120 may transmit an indication of the particular user interaction region selected by the user 110. Upon receiving the indication of the user interaction with the e-commerce functionality on the user device 120, the website publisher computers 130 may be able to ascertain the product or service associated with the user interaction.

At block 708, it may be determined if the website publisher computers sell the product or service. This determination may be based upon the website publisher computers 130 accessing a data base of products or services that the website publisher computers provide for sale. In some cases the website publisher computers have e-commerce functionality. In other cases the website publisher computers do not provide e-commerce functionality. In these cases the website publisher computers may not directly instantiate any product or service sales. Therefore in this case the website publisher computers may not sell the products or services associated with the advertisement. Additionally if the website publisher computers determine that products or services associated with the advertisement are not currently available for sale such as those products or services are not in inventory or cannot be shipped then a determination may be made that the publisher computers do not currently sell the products or services.

If it is determined that the website publisher computers 130 do sell the products or service associated with the user interaction then at block 710, an e-commerce transaction based at least in part on the user interaction may be commenced. This interaction may entail interacting with the user 110 via his or her user device 120 to sell the user 110 the product or service associated with the user interaction. This type of interaction may involve receiving additional information related to the product or service such as variation types and/or colors and/or models associated with the product or service from the user as well as payment instructions and delivery instructions.

If at block 708 it is determined that the website publisher computers do not sell the product or service, then the indication of the user interaction may be transmitted to an e-commerce computer. The e-commerce computers 320 may be configured to carry out an e-commerce function associated with the user interaction. Therefore, in this case the e-commerce computers 320 may receive an indication of the product or service associated with the user interaction from the website publisher computers. Additionally the e-commerce computers 320 may be configured to get additional product or service information as well as payment information and delivery information from the user 110 via his or her user device 120, either directly by the e-commerce computers 320 interacting with the user device 120 or via the website publisher computers 130.

Figure 8:
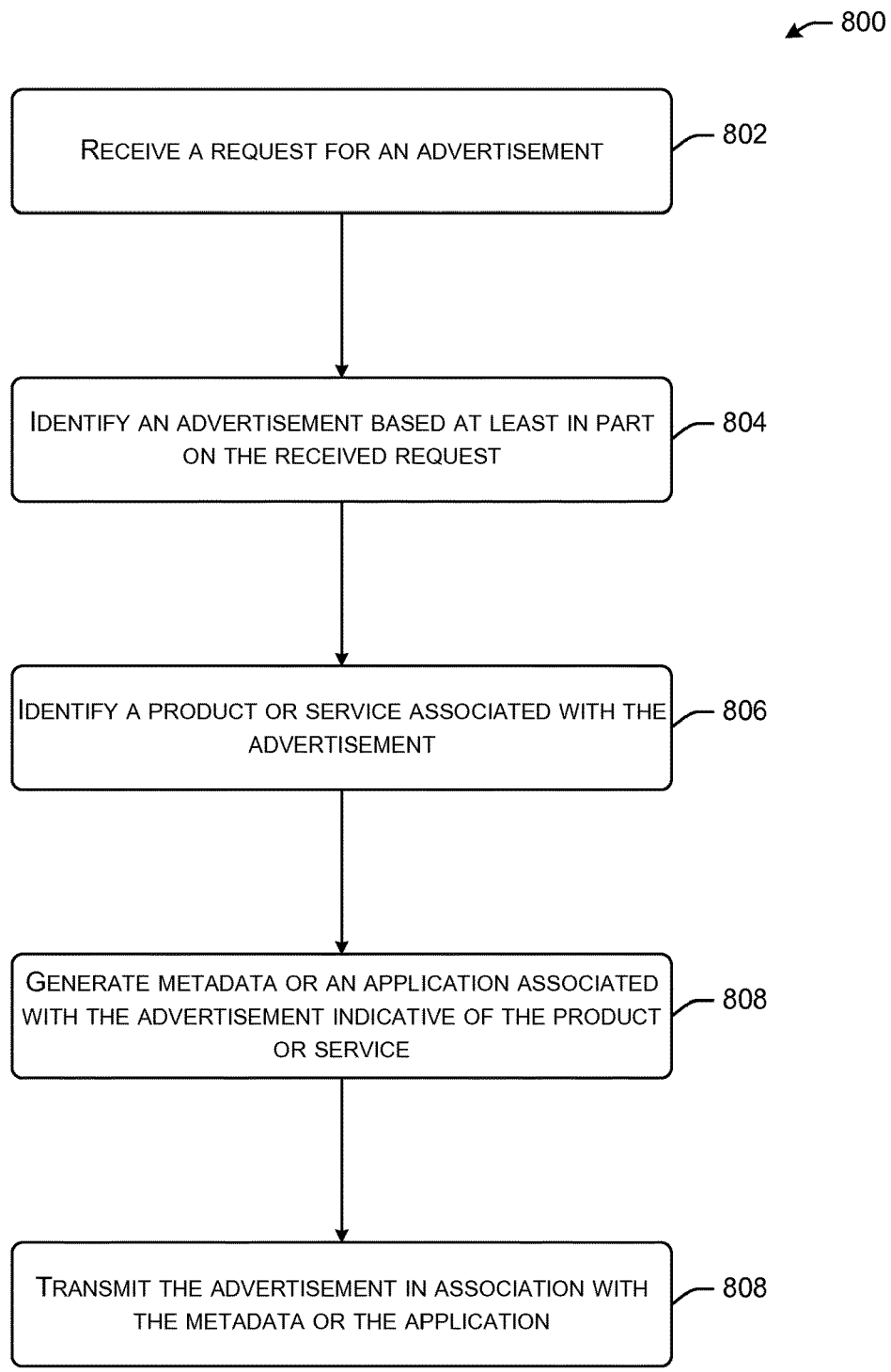
FIG. 8 is a flow diagram illustrating an example method performed by an advertisement server for providing metadata associated with an advertisement, in accordance with illustrative embodiments of the disclosure.

Referring now to FIG. 8, an example method 800 for transmitting advertisements with metadata or application associated with the advertisement in accordance with embodiments of the disclosure is depicted. This method 800 may be performed by the advertisement server computers 130. At block 802, a request for advertisement may be received. This request for advertisement may be received from the website publisher computers 130 via the networks 324 or other suitable communicative links such as a direct link between the website publisher computers 130 and the advertisement server computers 130.

At block 804, an advertisement may be identified based at least in part on the request for advertisement. In this case the advertisement selected may be selected from a repository of available advertisements such as advertisements that may be stored in an advertisement repository such as the memory 350 or the advertisement datastore 360. In some cases, the advertisement may be selected in cooperation with one or more other entities of the architecture 100, such as the advertisement exchange computers 310. In these cases, the advertisement may be selected based upon a variety of factors such as user preferences, user characteristics, current prices of advertisements, current viewing rates of advertisements, current demand for advertisement, or the like. In some cases, the selection may involve one or more information transmitted by the website publisher computers 130 to the advertisement server computers 140. This information may include information pertaining to the user 110 requesting content from the website publisher computers 130. For example, if user preferences are known, then that information may be transmitted by the website publisher computers 130 to the advertisement server computers 140 which may select an advertisement based at least in part on the user preferences.

At block 806, a product or service associated with the advertisement may be identified. This identification may be based upon accessing a database that provides associations of products and services to advertisements that are available to the advertisement server computers 140 for transmission to the website publisher computers 130. In certain embodiments, the product or service association with the advertisement may be provided by the entity that provides the advertisement to the advertisement server computers 140. For example, a manufacturer of a product may provide the advertisement to the advertisement server computers 140 and may provide an association of a product to the advertisement server computers 140.

At block 808, metadata or an application associated with the advertisement indicative of the product or service may be generated. The processors 342 may determine the identification of the product or service and generate code and/or textual data to indicate that product or service. In certain embodiments, the metadata or application associated with the advertisement may be separate code or text from the advertisement. In other cases, the metadata or application may be incorporated within the advertisement.

At block 810, the advertisement along with the metadata or application associated with the advertisement may be transmitted. The advertisement and the metadata and/or application may be transmitted by the advertisement server computers 150 to the website publisher computers 130 such as responsive to the request for advertisement as received at block 802 via one or more networks 324 or other communicative links between the advertisement server computers 150 and the website publisher computers 120.

Figure 9:
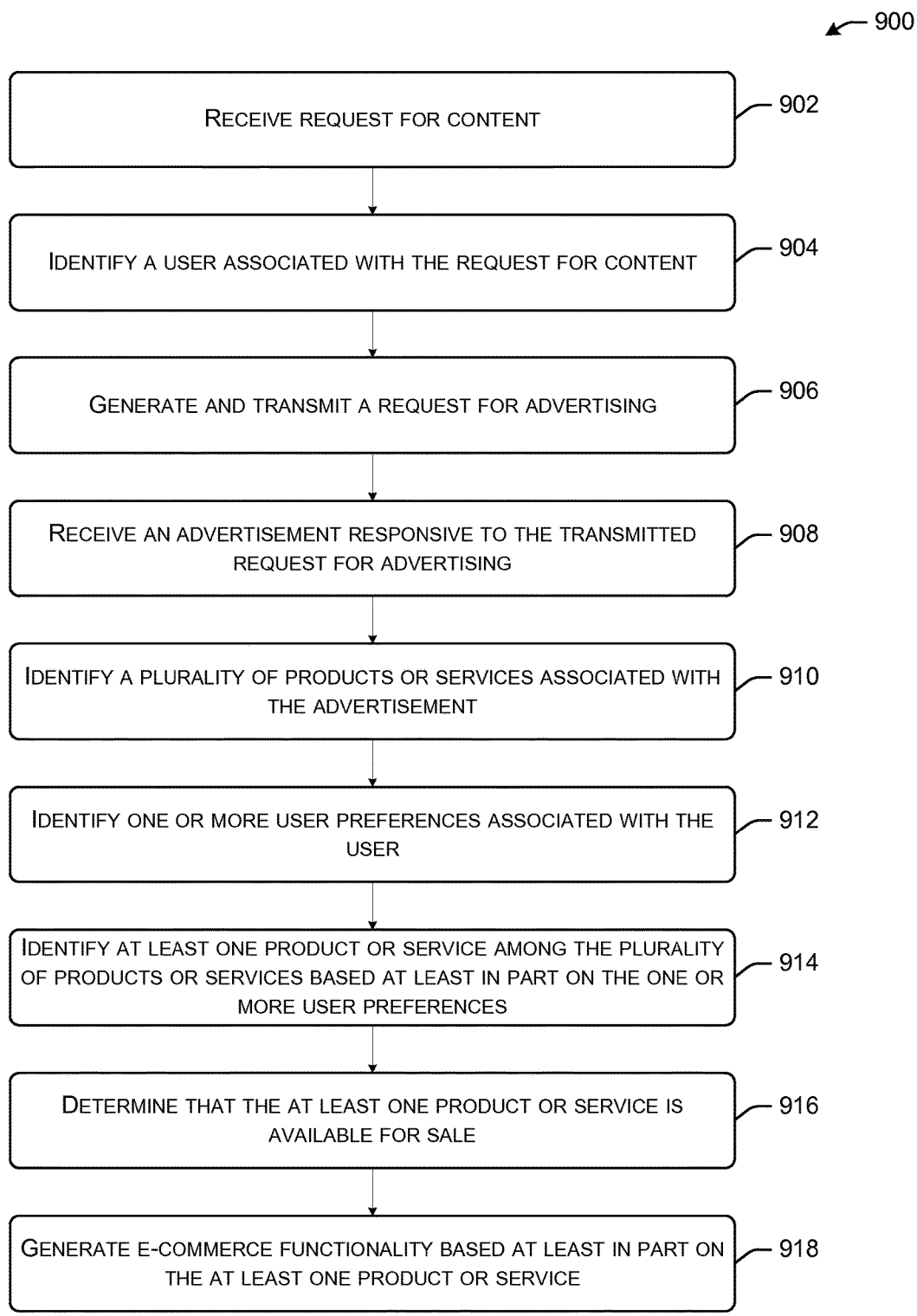
FIG. 9 is a flow diagram illustrating an example method for generating e-commerce functionality associated with an advertisement based at least in part on one or more user preferences, in accordance with illustrative embodiments of the disclosure.

Referring now to FIG. 9, an example method 900 to generate e-commerce functionality based, at least in part, on one or more user preferences in accordance with embodiments of the disclosure is depicted. The method 900 may be performed by the website publisher computers 130 and the processors 372 thereon in cooperation with other entities of architecture 100. At block 902, a request for content may be received.

At block 904, a user associated with the request for content may be identified. This identification may be based upon prior identifiers received by the website publisher computers 130 from the user device 120, from which the request for content is received. For example, a user 120 may have logged in to the website publisher computers 130 using a login and password and thereby identified himself or herself In other cases, the user 120 may be identified by the user device 120 from which the request for content is received such as by Internet Protocol (IP) Address of the user device 120.

At block 906, a request for advertisement may be generated and transmitted. This request for advertisement may be transmitted by the website publisher computers 130 to the advertisement server computers 150 via the networks 324 or other suitable communicative links between the website publisher computers 130 and the advertisement server computers 130. At block 908, an advertisement may be received responsive to the transmitted request for advertisement. The advertisement may be received from the advertisement server computers 140 via the networks 324 or other suitable communicative links. The advertisement may be in the form of one or more data packets suitable for transmission via the networks 324 or other suitable communicative links.

At block 910, a plurality of products or services associated with the advertisement may be identified. The identification of the plurality of products or services may be performed using a method similar to method 500 as depicted in FIG. 5. In particular, a variety of mechanisms may be employed and the identification of the plurality of products or services including image analysis, click-through analysis, or analysis by third-party services. At block 912, one or more user preferences associated with the user may be identified. The user preferences may be related to the user's demographic profile, past purchases, past website viewing history or the like. The one or more user preferences may be memorialized as one or more user parameters and may be stored in a repository of user information such as in memory 380. The repository and the parameters stored therein may be accessed by the processors 372 and processed to ascertain preferences associated with the user.

At block 914, at least one of the plurality of products or services may be selected based, at least in part, on the one or more user preferences. In certain embodiments, products or services that are most likely to be purchased by the user 110 may be selected. This likelihood of purchase may be determined based, at least in part, on the one or more user preferences associated with the user 110 by the processors 372. At block 916, it may be determined that at least one of the plurality of products or services are available for sale. At block 918, e-commerce functionality may be generated based, at least in part, on the at least one of the plurality of products or services selected.

Figure 10:
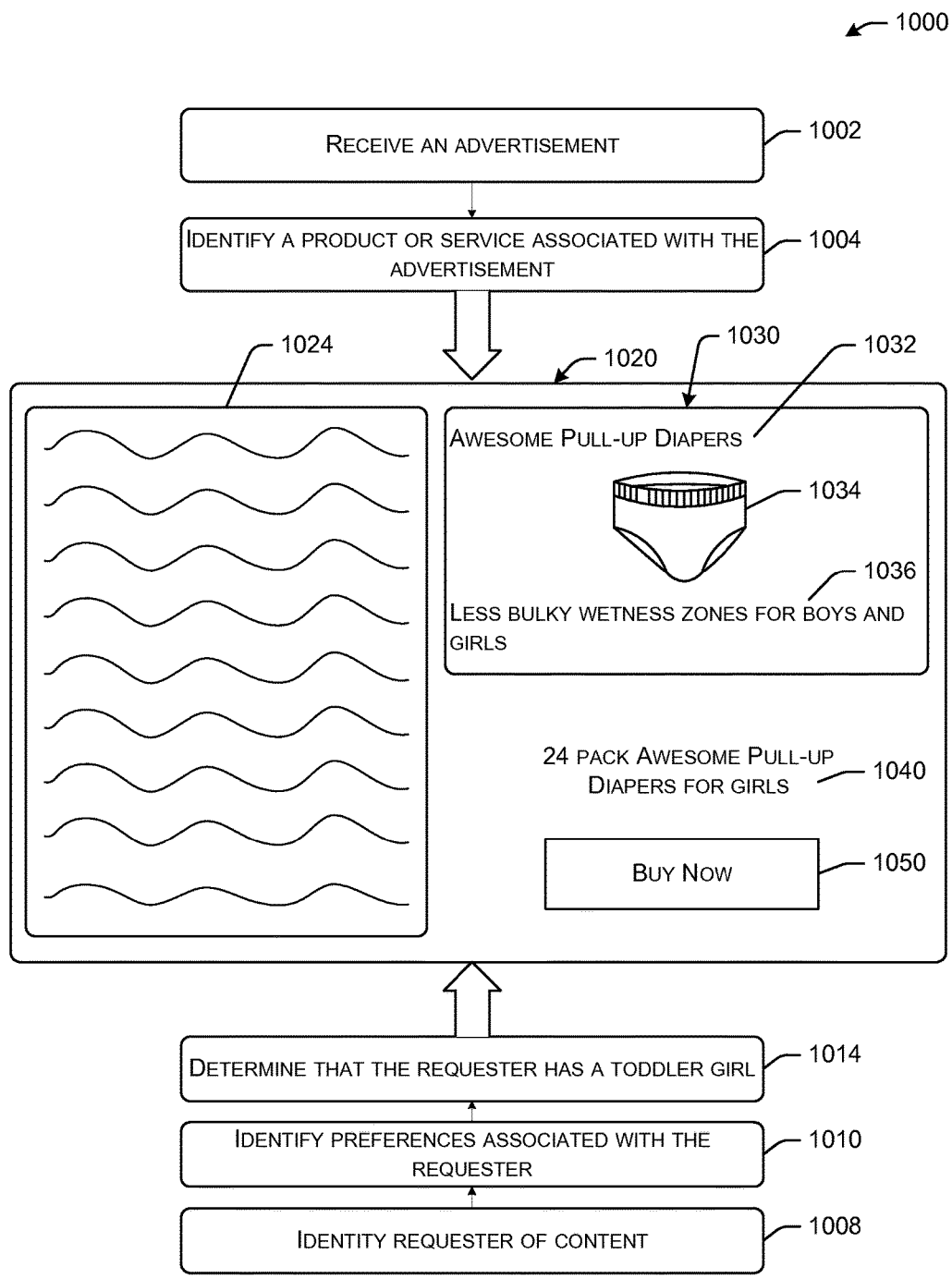
FIG. 10 is a simplified schematic diagram illustrating a user interface with an advertisement and associated e-commerce functionality rendered, in accordance with illustrative embodiments of the disclosure.

Referring now to FIG. 10, an example implementation 1000 of the method 900 of FIG. 9 is depicted. As depicted in block 1002, an advertisement may be received by the website publisher computers 130. At block 1004, a product or service may be identified associated with the advertisement. The process of identifying the product or service has been discussed above and will not be repeated here in the interest of brevity.

At block 1008, the requester of content may be identified. At block 1010, user preferences associated with the requester may be accessed. These user preferences may be accessed by the processors 372 from a repository of user information such as user information that may be stored in memory 380. From the user preferences, the processors 372 and the website publisher computers 130 may determine that the requester has a toddler girl 1014. Accordingly, the website publisher computers 130 may provide a webpage 1020 that incorporates the requested content 1024 as well as an advertisement 1030 along with elements of the e-commerce functionality 1040, 1050. The advertisement 1030 may include images 1034 and text 1032, 1036. The e-commerce functionality may include a descriptor of a product or service that may be offered for sale 1040 and a user interaction region 1050 for instantiating a purchase of the associated product or service. In this case, the product or service is a diaper such as a pull-up diaper. Based upon user preferences, the website publisher computers 130 may determine that the user 110 may have a toddler girl and not a toddler boy. Therefore, the e-commerce functionality 1040, 1050 provided for this particular user 110 may be directed to diapers for a toddler girl rather than a toddler boy. Therefore, a choice from available products, namely boy's diapers and girl's diapers, the website publisher computers 130 and the processors 372 thereon may determine that a particular one of those two products, namely the girl's diapers, are more likely to be purchased by the user 110.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/ machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A system, comprising:
   at least one memory storing computer-executable instructions; and
   at least one processor configured to access the at least one memory and to execute the computer-executable instructions to:
   receive, from a user device, a request for content;
   generate, based at least in part on the request for content, an advertisement request;
   transmit, to a first server device, the advertisement request;
   receive an advertisement based at least in part on the advertisement request over a first communication network from the first server device;
   identify a product or service associated with the advertisement;
   determine that the product or service is available for sale;
   generate, based at least in part on the determination that the product or service is available for sale, functionality that directs the user device to display a selectable visual element as part of the advertisement, the selectable visual element based at least in part on the product or service and configured to facilitate a purchase of the product or service; and
   transmit the content, the advertisement, and the functionality over a second communication network to the user device.

2. The system of claim 1, wherein the at least one processor is further configured to execute the computer-executable instructions to identify the product or service associated with the advertisement by at least one of: receiving metadata associated with the advertisement; receiving an application associated with the advertisement; performing image processing on the advertisement; transmitting the advertisement to a third party entity; performing a click through analysis of the advertisement; receiving information from an advertisement association database; or performing a text analysis.

3. The system of claim 1, wherein to generate the functionality, the at least one processor is further configured to execute the computer-executable instructions to generate the selectable visual element.

4. A method, comprising:
   receiving, by a first computer comprising one or more processors, an advertisement from a first server device;
   identifying, by the first computer, one or more products or services associated with the advertisement;
   determining, by the first computer, that a product or service of the one or more products or services is available for sale;
   generating, by the first computer and based at least in part on the determination that the product or service is available for sale, functionality that directs a user device to display a selectable visual element as part of the advertisement, the selectable visual element configured to facilitate a purchase of the product or service; and
   transmitting, by the first computer, the advertisement and the functionality to the user device.

5. The method of claim 4, further comprising:
   transmitting, by the first computer to the first server device, an advertisement request,
   wherein the advertisement is received responsive to the advertisement request.

6. The method of claim 5, further comprising:
   receiving, by the first computer, a request for content; and
   generating, by the first computer, the advertisement request based at least in part on the request for content.

7. The method of claim 4, wherein identifying the one or more products or services associated with the advertisement comprises at least one of:
   receiving metadata associated with the advertisement;
   receiving an application associated with the advertisement;
   performing image processing on the advertisement; transmitting the advertisement to a third party entity;
   performing a click through analysis of the advertisement;
   receiving information from an advertisement association database; or
   performing text analysis.

8. The method of claim 4, wherein generating the functionality comprises generating, by the first computer, the selectable visual element.

9. The method of claim 4, further comprising:
   receiving, by the first computer, an indication of interaction with the selectable visual element; and
   determining, by the first computer, a description of the product or service associated with the selectable visual element.

10. The method of claim 4, wherein the functionality is based at least in part on one or more user preferences.

11. The method of claim 4, further comprising:
    generating, by the first computer, a purchase order for the product or service based at least in part on the functionality.

12. The method of claim 9, further comprising:
transmitting, by the first computer to a second computer, the indication of interaction with the selectable visual element.

13. At least one non-transitory computer-readable medium comprising computer-executable instructions that responsive to execution by one or more processors causes operations to be performed comprising:
receiving an advertisement from a first server device;
identifying the advertisement;
determining a product or service associated with the advertisement based at least in part on the advertisement;
determining that the product or service is available for sale;
generating, based at least in part on the determination that the product or service is available for sale, functionality that directs a user device to display a selectable visual element as part of the advertisement, the selectable visual element configured to facilitate a purchase of the product or service; and
transmitting the advertisement and the functionality to the user device.

14. The at least one non-transitory computer-readable medium of claim 13, wherein determining the product or service associated with the advertisement comprises at least one of: receiving metadata associated with the advertisement; receiving an application associated with the advertisement; performing image processing on the advertisement; transmitting the advertisement to a third party entity; performing a click through analysis of the advertisement; receiving information from an advertisement association database; or performing text analysis.

15. The at least one non-transitory computer-readable medium of claim 13, wherein generating the functionality comprises generating the selectable visual element.

16. The at least one non-transitory computer-readable medium of claim 13, wherein generating the functionality comprises generating the functionality based at least in part on one or more user preferences.

17. The at least one non-transitory computer-readable medium of claim 13, wherein the one or more processors causes further operations to be performed comprising:
receiving an indication of interaction with the selectable visual element; and
determining a description of the product or service associated with the selectable visual element.

18. The at least one non-transitory computer-readable medium of claim 14, wherein the one or more processors causes further operations to be performed comprising:
generating a purchase order for the product or service.

19. The system of claim 1, wherein the at least one processor is further configured to execute the computer-executable instructions to:
identify a merchant that sells the product or service; and
determine that the product or service is available for sale from the merchant.

* * * * *